United States Patent
Barron

(10) Patent No.: US 10,392,157 B2
(45) Date of Patent: Aug. 27, 2019

(54) CUTTING TOOTH OF A ROTATABLE CUTTING DEVICE OF A PACKAGING CLOSURE

(75) Inventor: Dan Barron, Schaffhausen (CH)

(73) Assignee: ROBERT BOSCH GMBH, Stuttgart (DE)

( * ) Notice: Subject to any disclaimer, the term of this patent is extended or adjusted under 35 U.S.C. 154(b) by 248 days.

(21) Appl. No.: 14/114,674

(22) PCT Filed: Mar. 2, 2012

(86) PCT No.: PCT/EP2012/053648
§ 371 (c)(1),
(2), (4) Date: Feb. 4, 2014

(87) PCT Pub. No.: WO2012/146425
PCT Pub. Date: Nov. 1, 2012

(65) Prior Publication Data
US 2014/0137717 A1    May 22, 2014

(30) Foreign Application Priority Data
Apr. 29, 2011  (DE) .......................... 10 2011 017 793

(51) Int. Cl.
*B65D 5/74* (2006.01)
*B23D 61/02* (2006.01)

(52) U.S. Cl.
CPC ........... *B65D 5/748* (2013.01); *B23D 61/028* (2013.01); *Y10T 83/9367* (2015.04)

(58) Field of Classification Search
CPC .......... B65D 3/26; B65D 3/261; B65D 3/268; B65D 5/74; B65D 5/747; B65D 5/748;
(Continued)

(56) References Cited

U.S. PATENT DOCUMENTS 3,005,478 A * 10/1961 Don Laviano ....... B23D 61/121
 30/123
5,141,133 A *  8/1992 Ninomiya .............. B65D 5/748
 222/541.2

(Continued)

FOREIGN PATENT DOCUMENTS

CH           695019 A5 * 11/2005   ............. B65D 5/748
CH           698661        9/2009
(Continued)

OTHER PUBLICATIONS

English Translation of CH695019.*
(Continued)

*Primary Examiner* — Jennifer B Swinney
(74) *Attorney, Agent, or Firm* — Michael Best & Friedrich LLP

(57) ABSTRACT

A cutting tooth (101) of a cutting device is disclosed as part of a closure device for opening a container covering for the first time. The shape of the cutting tooth (101) with a blunted tooth tip (1011) with a cutting edge (1012) leads to improved cutting results, wherein the container covering is notched or nicked. Here, each cutting tooth (101) has a robust tooth tip (1011) without edges which cuts into the container covering as a result of rotation of a cap of the closure device, wherein the cutting device is moved along with it.

15 Claims, 4 Drawing Sheets

(58) Field of Classification Search
CPC ........ B65D 5/741; B65D 5/743; B65D 5/746; B65D 5/742; B65D 51/22; B65D 51/222; B65D 75/5861; B65D 75/5866; B54D 5/749; Y10T 83/9367
USPC ... 222/83, 80, 81, 82, 83.5, 88, 278, 85, 86, 222/87, 89, 90, 91
See application file for complete search history.

(56) References Cited

U.S. PATENT DOCUMENTS

| | | | | |
|---|---|---|---|---|
| 5,297,696 | A * | 3/1994 | Bernstein | B67B 7/26 222/83 |
| 5,671,770 | A * | 9/1997 | Rusche | B67B 7/26 137/318 |
| 2007/0187428 | A1* | 8/2007 | Dzabrailova | B65D 5/748 222/83 |
| 2008/0029540 | A1* | 2/2008 | Johnson | B65D 75/5877 222/83 |
| 2008/0179331 | A1* | 7/2008 | Sharp | B65D 51/224 220/521 |
| 2009/0250488 | A1* | 10/2009 | Dubach | B65D 5/748 222/83 |
| 2009/0326485 | A1* | 12/2009 | Carlyon | A61J 1/2096 604/272 |
| 2010/0018992 | A1* | 1/2010 | Dill | B65D 5/747 222/83 |
| 2012/0137634 | A1* | 6/2012 | Cagle | C11C 5/021 53/431 |
| 2012/0138634 | A1* | 6/2012 | Benko | B65D 5/748 222/83 |

FOREIGN PATENT DOCUMENTS

| | | | | |
|---|---|---|---|---|
| CN | 1290639 | | 4/2001 | |
| CN | 1874954 | | 12/2006 | |
| CN | 101316762 | | 12/2008 | |
| CN | 101395064 | | 3/2009 | |
| DE | 102006015524 | | 8/2007 | |
| EP | 0448329 | | 9/1991 | |
| EP | 1533240 | | 5/2005 | |
| EP | 1902965 | A1 * | 3/2008 | |
| GB | 2071600 | A * | 9/1981 | ............... B67B 7/30 |
| JP | 2002104473 | * | 4/2002 | |
| JP | WO 2006038251 | A1 * | 4/2006 | ............. B65D 5/748 |
| WO | 96/11850 | | 4/1996 | |
| WO | Wo2010128302 | A1 * | 11/2001 | |
| WO | 2008/148230 | | 12/2008 | |
| WO | WO 2009111899 | A1 * | 9/2009 | ............. B65D 5/748 |
| WO | 2011039054 | | 4/2011 | |
| WO | 2011039125 | | 4/2011 | |

OTHER PUBLICATIONS

English Translation of JP2002104473.*
International Search Report for Application No. PCT/EP2012/053648 dated May 16, 2012 (3 pages).

* cited by examiner

FIG. 1a
FIG. 1b
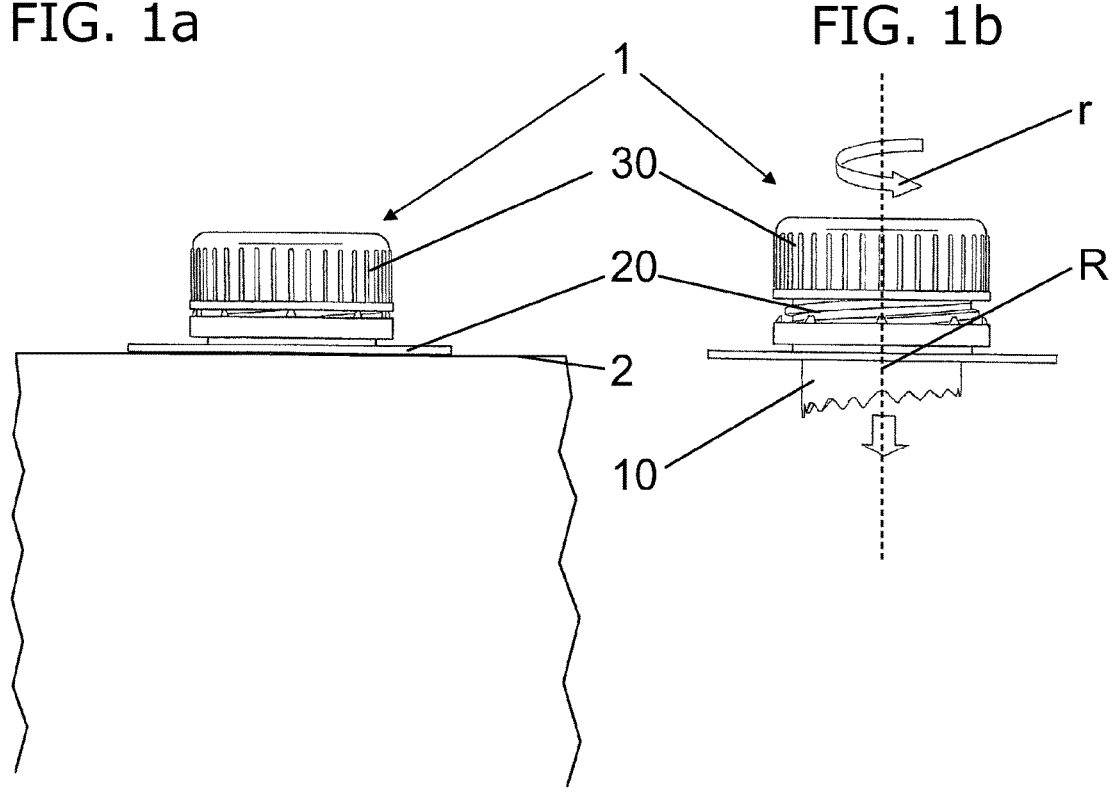
FIG. 2
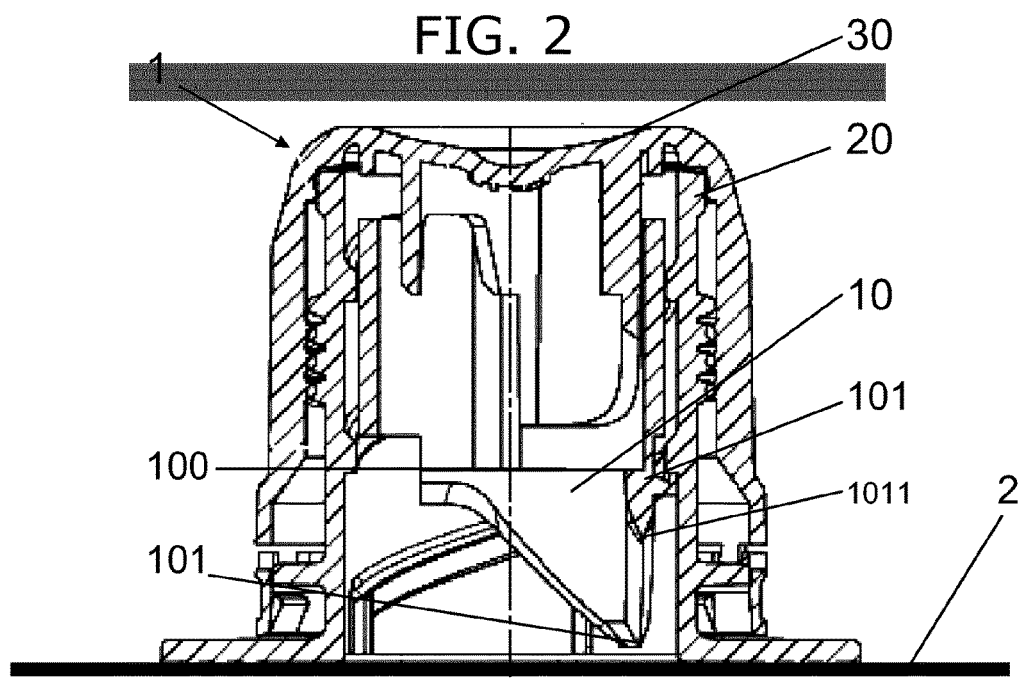

prior art

CUTTING TOOTH OF A ROTATABLE CUTTING DEVICE OF A PACKAGING CLOSURE

BACKGROUND OF THE INVENTION

The present invention relates to a cutting tooth of a cutting device made from a thermoplastic material, wherein the cutting device can be operatively connected to a closure device that is attachable to a container covering and can be rotated about a rotational axis and wherein the cutting tooth is equipped with a tooth tip in a direction pointing away from an edge of the cutting device; thus enabling the cutting device to be used for opening the container covering for the first time.

Closure devices on containers made of plastic for storing free-flowing substances have been industrially manufactured in large numbers for a long time. The closure devices have a cutting device comprising at least one cutting tooth, the cutting device being operatively connected to the closure device. By manipulating a cap which is attachable to a pouring neck, both parts being part of the closure device, the cutting device is employed to open the container covering. The cutting device is rotated during the initial opening and moved linearly in the direction of the container covering; thus enabling the cutting teeth to cut open the container covering and provide an opening.

In order to achieve an opening of the container covering in a reproducible manner even when plastic layers and laminated layers consisting of plastic materials, light metal alloys and cardboard are used, the industry made due in recent years with a temporary solution. The container covering was equipped with a film patch which can easily be cut and into which the cutting teeth of the cutting device can easily cut.

After a first cutting tooth has pierced the container covering, said container covering is cut open or more precisely ripped open in the direction of rotation by said first cutting tooth or further cutting teeth equipped with a cutting edge.

All components of the closure device are as a rule produced or injection molded from thermoplastic materials as one piece in a plastic injection molding process. By simply pushing the components in the longitudinal direction of the axis of rotation of the closure device, the finished closure device which can be mounted to the container covering is assembled.

The cutting devices are injection molded using a central mold core and a mold encasing the mold core. The cavity between mold core and mold is correspondingly used to produce the cutting device. As a rule, the recess for the cutting tooth to be produced is either formed into the mold or the mold core, whereby a fast and simple parting of the two mold parts is facilitated. The parting plane or line between the two mold parts therefore aligns either with the outer surface of the mold core or the inner surface of the mold.

The cutting tooth was created with a maximally tapering tooth tip, whereby the parting line is disposed directly at the thinnest point of the tooth tip in an extending manner. Due to the geometry of the tip, a weakened tooth tip was achieved, which is flexible on account of the thin material layer as is known from the prior art and is depicted in FIG. 6.

Beside a weakly designed tooth tip due to small material thickness, edges and flashes result in the region of the parting line. Increased internal pressure in the injection molding tool can exceed the closing force between mold core and mold, whereby the parting plane is severely stressed. The force on the injection molding tools or, respectively, the parting plane is indicated with arrows in FIG. 6. A so-called breathing of the injection molding tool can occur and a portion of the injection mold material undesirably enters the region of the parting line between the two injection molding tool parts. An injection molding edge results in the region of the parting line and thereby on the outermost tooth tip. Said injection molding edge leads to an additional instability of the tooth tip. Such a tooth tip is not sufficiently tight and, depending on the container covering that is used and is to be pierced, does not have or has only a weak perforating effect and thus leads to a bending of the tooth.

Because a multiplicity of cutting teeth is used, one could have assumed that a sufficient perforating effect could nevertheless have been achieved and the container covering was at least partially pierced. As soon as the cutting teeth pierced the container covering, only the cutting effect of the cutting teeth was utilized, which is independent of the shape of the unstable tooth tip. In order to improve the cutting effect, the person skilled in the art has tried to develop suitable cutting teeth through the use of dimensionally stable plastics.

In order to solve this problem, the receptacle was manufactured from a high-strength plastic foil and a hole was punched out and was closed with a thinner film that can be perforated more easily. The closure device was subsequently welded thereupon. This process is time consuming and expensive.

The analyzed cutting results from known cutting devises reveal very ragged even sheered cutting lines. In order to pour the contents of a container out of closure device in a desirable manner, an improved and smooth cutting line that is as even as possible is desired, wherein it must be ensured in any case that no container covering material is separated and enters into the container or, respectively, the contents.

SUMMARY OF THE INVENTION

The aim of the present invention is to create cutting teeth of a cutting device from thermoplastic material for a closure device, said teeth having a reproducible cutting effect and resulting in an even and smooth cutting line without thereby having to make special provisions on the container covering.

This aim is met by the cross-sectional area of the cutting tooth, defined by a radial cutting plane through the tooth tip and the axis of rotation of the cutting device, being embodied in the region of the tooth tip that faces away from the edge in a blunt manner and comprising a cutting edge, wherein the cutting edge extends in a plane that is perpendicular to the axis of rotation and can be used to cut into the container covering, wherein a cutting tooth is designed with an extremely stable tooth tip. The cutting teeth do not have a perfectly tapered outer tooth tip but are robust and are designed blunt in comparison to the tooth tips from the prior art. When disposed on a cutting device, such cutting teeth gradually develop a practically machined cutting effect because as part of a machining operation, each cutting tooth penetrates the container covering in a notching instead of perforating manner. As a result, a smooth, clean cutting line can be achieved.

BRIEF DESCRIPTION OF THE DRAWINGS

A preferred exemplary embodiment of the subject matter of the invention is described below in conjunction with the attached drawings.

FIG. 1a shows a side view of a closure device on a container covering in the closed position prior to the initial opening, whereas FIG. 1b shows a side view of a closure device in the completely opened position and comprising a cutting device which is completely unscrewed, wherein the cap has not yet been removed.

FIG. 2 shows a diametric longitudinal section through a further closure device.

FIG. 3 shows a perspective view of the cutting device pursuant to FIG. 2, whereas

DETAILED DESCRIPTION

Figure 3:
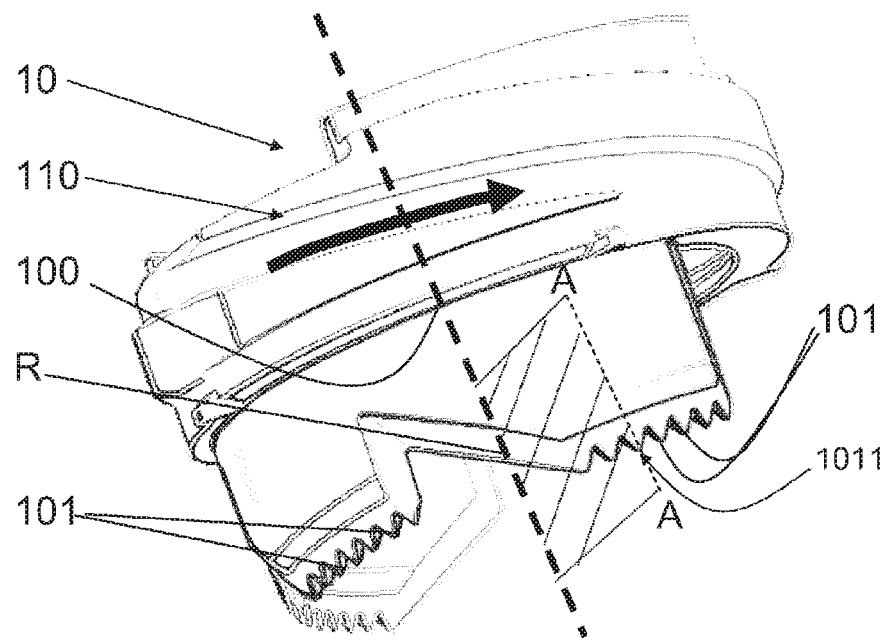

A closure device 1, comprising a pouring neck 20 with a flange and a cap 30, is placed on a container covering 2 and is thereby undetachably attached to a container as depicted in FIG. 1a. The container covering 2 is manufactured from plastic film, paper, cardboard or multi-layered laminated materials, which have among other things light metal alloy layers.

A cutting device 10 is operatively connected to the closure device 1 and can be rotated within the pouring neck 20 about an axis of rotation R. Said cutting device is furthermore mounted so as to be movable linearly in the direction of the container covering 2. When the cap 30 is rotated in a direction of rotation r, a mechanism causes the cutting device 10 to cut into the container covering 2 and in so doing to produce an opening in the container covering 2 upon opening the cap 30 of the closure device 1 for the first time.

As is shown by the longitudinal section through a closure device 1 pursuant to FIG. 2, The cutting device 10, which is movably mounted in the pouring neck 20 has a plurality of cutting teeth 100 comprising in each case a tooth tip 1011. The cutting device 10 is rotated in a guided manner within the pouring neck 20 and moved in the direction of the container covering 2 by means of entraining elements integrally formed on the cap 30.

The cutting device 10 is substantially shaped as a cylinder and has a threaded portion 110 and an edge 100 from which the majority of cutting teeth 110 project so as to point away from the same. When the cap 30 is rotated, the cutting device 10 is rotated in the direction of motion indicated by the solid arrow and is driven forward in the direction of the container covering 2. In the exemplary embodiment shown here, a plurality of portions are equipped with cutting teeth 101.

Figure 4:
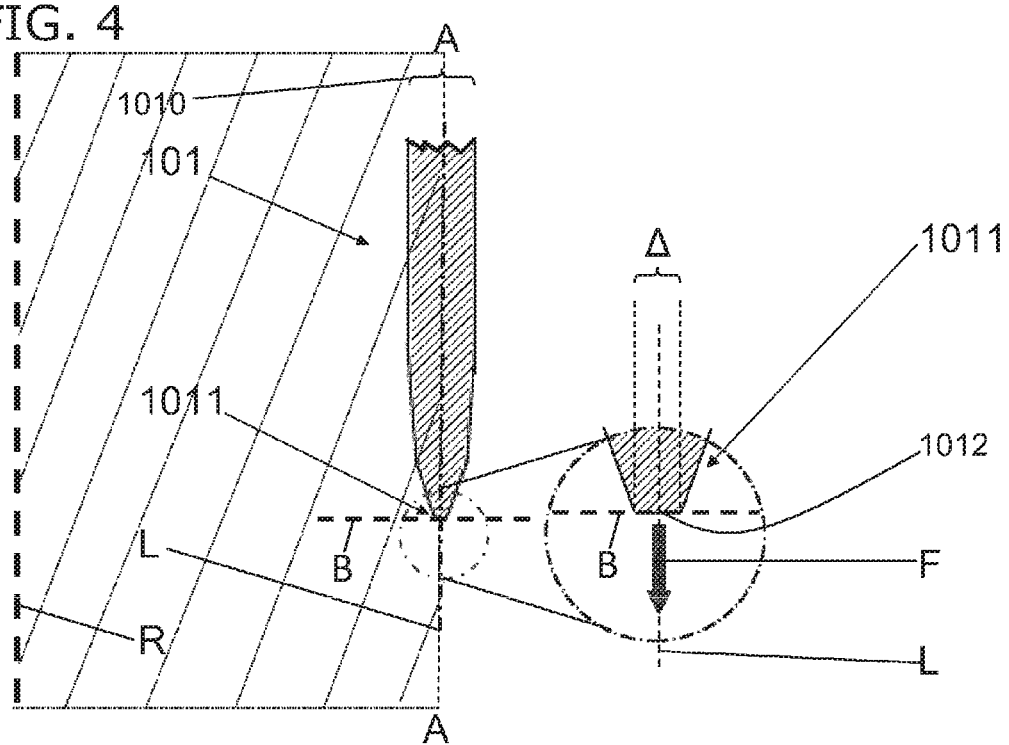
FIG. 4 shows a longitudinal section through a cutting tooth according to the line A-A from FIG. 3, the region of the tooth tip being shown enlarged.

The geometric shape of the cutting teeth 101 is responsible for an improved cutting result. If the cross-sectional area of a cutting tooth 101 in a radial cutting plane is considered, as indicated by the hatched area in FIG. 3, the longitudinal section through a cutting tooth 101 pursuant to FIG. 4 is then obtained. In FIG. 3, the cutting plane extends from the line A-A up to the axis of rotation R of the cutting device 10 in the radial direction, whereby the parallelogram depicted is defined. The cutting plane extends thereby through the tooth tip 1011 and the axis of rotation R of the cutting device 10 and thus radially cuts the cutting tooth 101 so a surface normal of the cross-sectional area is disposed tangentially with respect to the cutting device 10.

The outer tooth tip 1011, which is disposed opposite the edge 100, has a cutting edge 1012 which delimits the tooth tip 1011 and blunts the same. The cutting edge 1012 at least partially delimits the tooth tip 1011. The cutting edge 1012 is planar and defines a plane B, as shown in FIG. 4. The plane B is perpendicular to the axis of rotation R in the embodiment illustrated in FIG. 4.

In the embodiment depicted in FIG. 4, the tooth tip 1011 is depicted having a cutting edge 1012 that is configured in a mirror-inverted symmetrical manner with respect to the longitudinal axis L of the cutting tooth 101. A configuration which is not mirror-inverted symmetrical with respect to the longitudinal axis L is however also possible.

The cutting edge 1012 has a normal F which is disposed at least approximately parallel to the axis of rotation R of the cutting device 10.

The cutting tooth 101 is tapered from a maximum cross section 1010, the length of which typically assumes values between 0.5 mm and 1.5 mm, to a value A between 20% and 50% of the maximum cross section 1010 at the narrowest point thereof. Trials have shown that good cutting results can be achieved in this parameter range. The cutting edge 1012 or, respectively, the tooth tip 1011 is then nevertheless sufficiently stable to repeatably cut through the container covering 2. The length of the cutting edge 1012 is in each case smaller than the length of the maximum cross section 1010 of the cutting tooth 101.

A planar delimitation surface in the shape of a plateau can also be integrally formed on the tooth tip 1011. A delimitation line of the plateau is then formed by the cutting edge, wherein the plateau is disposed so as to extend approximately perpendicularly to the cross-sectional surface area of the cutting tooth 101.

The cutting edge 1012 cuts into the container covering 2 when the cutting device is being rotated and linearly propelled in the direction of the container covering 2. The tooth tip 1011 notches or cuts into the container covering 2 with the cutting edge 1012, wherein said cutting edge 1012 is continuously propelled in the direction of the container covering 2 until the cutting edge 1012 pierces said container covering 2. The shape practically corresponds to a tool similar to recessing tools used in metal processing.

Figure 5:
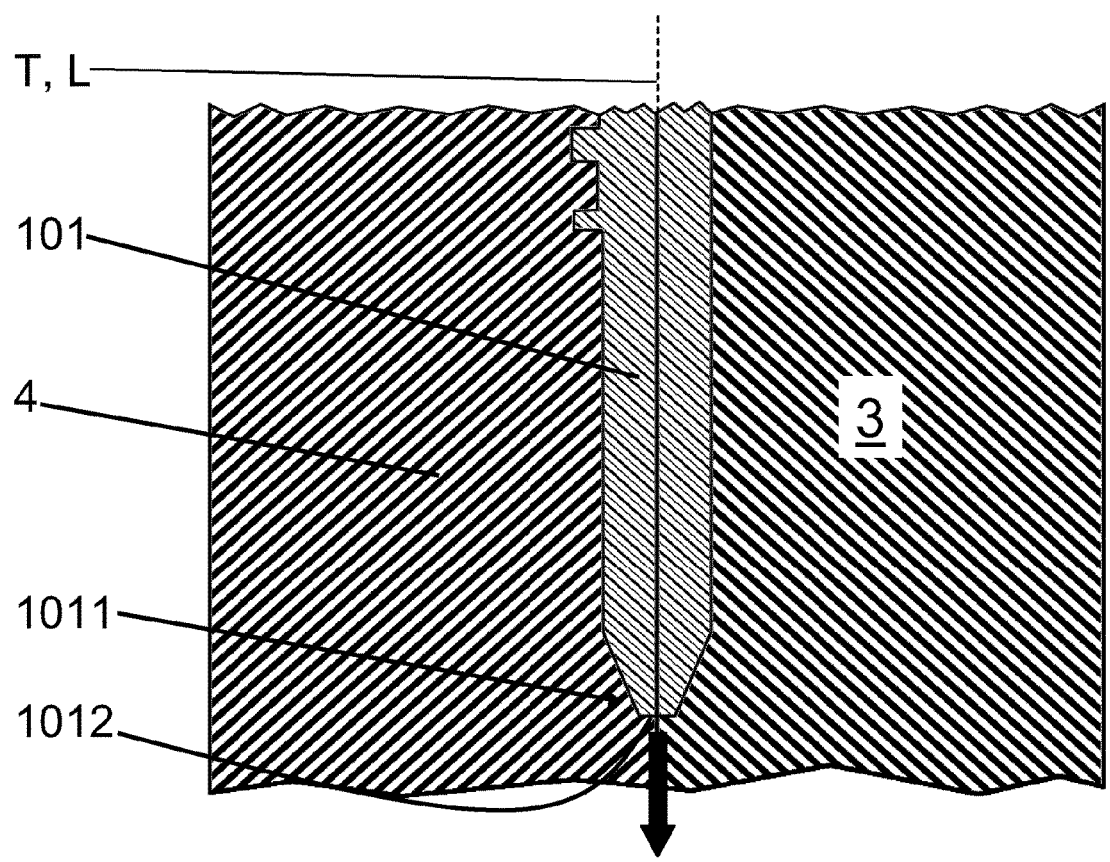
FIG. 5 shows a sectional view of a multi-parted injection molding tool in the region of the cavity in which a cutting tooth was produced.
Figure 6:
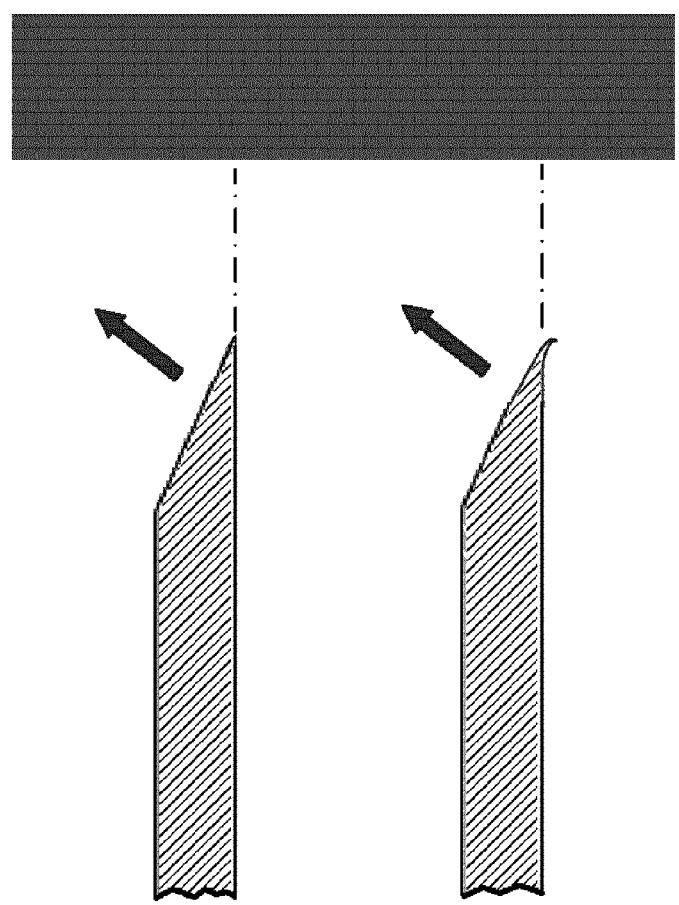
FIG. 6 shows longitudinal sections of known cutting teeth according to the prior art before and after use.

The simplified manufacture of the closure device 1 and particularly the cutting device 10 comprising the cutting teeth 101 is possible in an injection molding process and is schematically depicted in FIG. 5.

The molded parts, cutting device 10, pouring neck 20, cap 30 are produced in the injection molding process from thermoplastic materials in an injection molding device. After plasticizing the thermoplastic materials, for example polyethylene (PE) or polypropylene (PP), said thermoplastic materials are injected into a multi-parted injection molding tool, comprising a mold core 3 and a mold 4 which defines a cavity in which the subsequent molded parts 10, 20, 30 are produced.

The injection molding tool is designed in a dividable manner and has at least one parting plane or parting line T, in which it is to be opened. The mold core can only be pulled out if the injection molding tool is open, whereby the cutting device 10 is released on one side and the finished molded part is removed from the tool. This demolding preferably takes place with the use of an automatic machine-driven demolding system which also carries out the ejection of the molded part.

The cavity between mold core 3 and mold 4 is designed such that the parting plane T extends through the blunted tooth tip 1011 and the cutting edge 1012. The parting plane T comes to rest on a planar section and a large closing force is ensured. The injection molding tools can simply be placed on top of one another. The internal pressure in the injection molding tool acts perpendicularly to the junction between the two parts of the injection molding tool. Even in the case of high internal pressure in the injection molding tool, injection molding material is prevented from entering into the region of the parting line between the two parts of the injection molding tool 3, 4. The arrow depicted in FIG. 5 indicates the direction of the force of the injection molding material onto the parting line T.

Because none of the parts of the injection molding tool 3, 4 form in an aligned manner an outer lateral wall of the tooth tip 1011, wherein the parting line T has to be disposed so as to extend sufficiently far in the direction of the center of the tooth tip 101, edges or flashes are ruled out on the tooth tip 1011 or, respectively, on the outer periphery of the tooth tip 1011 or the cutting edge 1012. In so doing, an extremely stable tooth tip 1011 can be achieved.

What is claimed is:

1. A cutting tooth (101) of a cutting device (10), wherein the cutting device (10) is operatively connected to a closure device (1), which can be attached to a container covering (2), and is rotatable about an axis of rotation (R), wherein the cutting tooth (101) comprises a thermoplastic material and a tooth tip (1011) in a direction pointing away from an edge (100) of the cutting device (10) for opening the container covering (2) for a first time, characterized in that a cross-sectional area of the cutting tooth (101), defined by a radial cutting plane through the tooth tip (1011) and the axis of rotation (R) of the cutting device (10), includes a blunt cutting surface (1012) of the tooth tip (1011), wherein the cutting surface (1012) defines a plane (B) that is perpendicular to the axis of rotation (R) and is configured for cutting into the container covering (2).

2. The cutting tooth (101) according to claim 1, wherein a length of the cutting surface (1012) is smaller than a length of a maximum cross section (1010) of the cutting tooth (101).

3. The cutting tooth (101) according to claim 1, wherein a length of the cutting surface (1012) lies in a range from 20% to 50% of a length of a maximum cross section (1010) of the cutting tooth (101).

4. The cutting tooth (101) according to claim 1, wherein a length of a maximum cross section (1010) of the cutting tooth (101) lies at least between 0.5 mm and 1.5 mm, and a length of the cutting surface (1012) lies at least between 0.1 mm and 0.3 mm.

5. The cutting tooth (101) according to claim 1, wherein the cutting tooth is produced in a plastic injection molding process and a parting line (T) extends perpendicularly to the cross-sectional area and centrically through the cutting surface (1012).

6. The cutting tooth (101) according to claim 1, wherein a length of the cutting surface (1012) is 30% of a length of a maximum cross section (1010) of the cutting tooth (101).

7. The cutting tooth (101) according to claim 1, wherein the cutting surface (1012) is configured in a mirror-inverted symmetrical manner with respect to a longitudinal axis (L) of the cutting tooth (101).

8. The cutting tooth (101) according to claim 7, wherein the longitudinal axis (L) is parallel to the axis of rotation (R).

9. The cutting tooth (101) according to claim 1, wherein the cutting tooth (101) defines a longitudinal axis (L) extending parallel to the axis of rotation (R), and wherein the longitudinal axis (L) intersects the cutting surface (1012).

10. A cutting device (10) comprising a thermoplastic material, wherein the cutting device (10) is operatively connected to a closure device (1) fastened to a container covering (2) and is rotatable about a rotation axis (R), the cutting device (10) including at least one cutting tooth (101) that is provided with a tooth tip (1011) pointing away from an edge (100) of the cutting device (10) for opening the container covering (2) for the first time, characterized in that a cross-sectional area of the cutting tooth (101), defined by a radial cutting plane through the tooth tip (1011) and the rotation axis (R) of the cutting device (10), includes a blunt cutting surface (1012) of the tooth tip (1011), wherein the cutting surface (1012) defines a plane (B) that is perpendicular to the axis of rotation (R) and is configured for cutting into the container covering (2), wherein a length of the cutting surface (1012) is smaller than a length of a maximum cross section (1010) of the cutting tooth (101), and wherein the length of the cutting surface (1012) is 30% of the length of the maximum cross section (1010) of the cutting tooth (101).

11. The cutting device (10) according to claim 10, wherein the length of the maximum cross section (1010) of the cutting tooth (101) lies at least between 0.5 mm and 1.5 mm, and the length of the cutting surface (1012) lies at least between 0.1 mm and 0.3 mm.

12. The cutting device (10) according to claim 10, wherein the cutting tooth is produced in a plastic injection molding process and a parting line (T) extends perpendicularly to the cross-sectional area and centrically through the cutting surface (1012).

13. The cutting device (10) according to claim 10, wherein the cutting surface (1012) is configured in a mirror-inverted symmetrical manner with respect to a longitudinal axis (L) of the cutting tooth (101).

14. The cutting device (10) according to claim 13, wherein the longitudinal axis (L) is parallel to the axis of rotation (R).

15. The cutting device (10) according to claim 10, wherein the cutting tooth (101) defines a longitudinal axis (L) extending parallel to the axis of rotation (R), and wherein the longitudinal axis (L) intersects the cutting surface (1012).

* * * * *